(12) United States Patent
Nishijima et al.

(10) Patent No.: US 6,471,244 B1
(45) Date of Patent: Oct. 29, 2002

(54) AIRBAG AND AIRBAG ARRANGEMENT

(75) Inventors: Kazuyoshi Nishijima; Tetsuji Endo; Kazuhiro Kaneko, all of Shizuoka (JP)

(73) Assignee: Nihon Plast Co., Ltd., Fuji (JP)

( * ) Notice: Subject to any disclaimer, the term of this patent is extended or adjusted under 35 U.S.C. 154(b) by 0 days.

(21) Appl. No.: 09/533,776

(22) Filed: Mar. 24, 2000

(30) Foreign Application Priority Data

Apr. 28, 1999 (JP) .......................................... 11-123117

(51) Int. Cl.$^7$ ................................................ B60R 21/28
(52) U.S. Cl. .................... 280/742; 280/729; 280/730.1; 280/739; 280/742; 280/743.1
(58) Field of Search .............................. 280/729, 728.1, 280/728.2, 740.42, 743.1, 739

(56) References Cited

U.S. PATENT DOCUMENTS

| | | | |
|---|---|---|---|
| 5,240,283 A | 8/1993 | Kishi et al. .................. | 280/729 |
| 5,249,824 A | 10/1993 | Swann et al. ............... | 280/729 |
| 5,253,892 A | 10/1993 | Satoh ......................... | 280/731 |
| 5,492,363 A * | 2/1996 | Hartmeyer et al. .......... | 280/729 |
| 5,501,488 A * | 3/1996 | Saderholm et al. ......... | 280/739 |
| 5,560,649 A | 10/1996 | Saderholm et al. ......... | 280/743.1 |
| 5,573,270 A | 11/1996 | Sogi et al. ................... | 280/740 |
| 5,577,765 A * | 11/1996 | Takeda et al. ............... | 280/729 |
| 5,676,395 A * | 10/1997 | Oe et al. ..................... | 280/730.2 |
| 5,803,495 A * | 9/1998 | Jackson et al. ............ | 280/743.1 |
| 5,918,902 A * | 7/1999 | Acker et al. ............... | 280/743.1 |
| 5,927,748 A | 7/1999 | O'Driscoll .................. | 280/729 |
| 5,957,485 A | 9/1999 | Hirai .......................... | 280/729 |
| 6,050,596 A * | 4/2000 | Boerger ...................... | 280/729 |
| 6,059,312 A * | 5/2000 | Staub et al. ................. | 280/729 |
| 6,213,496 B1 * | 4/2001 | Minami et al. .............. | 280/729 |
| 6,224,101 B1 * | 5/2001 | Nishijima et al. ........ | 280/743.2 |

FOREIGN PATENT DOCUMENTS

| | | | | |
|---|---|---|---|---|
| EP | 483366 A1 * | 5/1992 | .......... | B60R/21/16 |
| EP | 775 614 | 5/1997 | | |
| JP | 06305392 A * | 11/1994 | .......... | B60R/21/28 |
| JP | 8-192703 | 7/1996 | | |
| JP | 2631300 | 4/1997 | | |

* cited by examiner

Primary Examiner—Daniel G. DePumpo
Assistant Examiner—Paul Royal, Jr.
(74) Attorney, Agent, or Firm—Foley & Lardner

(57) ABSTRACT

An airbag includes first and second base cloths and a middle base cloth arranged therebetween for defining first and second compartments in the airbag. Gas communicating ports are arranged in the vicinity of the outer periphery of the middle base cloth to ensure gas communication between the two compartments. Four ring-shaped fixing portions are arranged around a gas introduction port to connect the second and middle base cloths, one of which has an exhaust port formed inside.

16 Claims, 5 Drawing Sheets

AIRBAG AND AIRBAG ARRANGEMENT

BACKGROUND OF THE INVENTION

The present invention relates to an airbag and an airbag arrangement mounted, for example, to a steering wheel of a motor vehicle.

Airbag arrangements, which are mounted, for example, to steering wheels of motor vehicles, include an airbag that is inflated by inflow gas in the event of a collision for alleviating an impact to be applied to a vehicle occupant or a passenger. The airbag includes two circular nylon woven base cloths or panels, the outer peripheries of which are sewn together to have a shape like a flat bag. The vehicle body-side base cloth has a mounting hole, the periphery of which is fixed to a steering-wheel main body, and from which gas is introduced into the airbag 1. Normally, the airbag is received, in tiny fold, in the steering-wheel main body, and when an inflator is actuated, it is inflated toward the occupant by gas injected from the inflator so as to hold and restrain the occupant thrown forward, alleviating a collision impact to be applied him or her.

The airbag, demanded to develop flatly widely, is constructed, for example, to connect the passenger-side base cloth and the body-side base cloth by a tether belt. Moreover, as disclosed, for example, in JP-B2-2631300 and EP 0775614 A2, the airbag is constructed to connect the passenger-side base cloth and the body-side base cloth by a cloth with gas introducing holes so as to successively introduce gas injected from the inflator into inner sections. Such airbags have a restricted shape upon completion of development to carry out effective restraint of a passenger in a normal posture. Moreover, JP-A 8-192703 shows an airbag including a cloth panel for controlling gas flow to the outer periphery.

In these days, there is an increasing demand for airbags having excellent development characteristics that contribute to alleviation of the pressure to be applied to an occupant. In view of this, airbags are proposed which include a plurality of compartments arranged in layers for improvement of development characteristics, wherein gas is introduced first into the compartment disposed on the side of a vehicle body, which is evacuated from the compartment disposed on the side of an occupant or an object to be restrained. In order to obtain a flat shape at the initial stage of development, a middle base cloth for defining the body-side compartments receiving gas first is sewn to a body-side base cloth in a plurality of positions, and has a center portion fixed to a retainer by a screw or restricting means. After obtaining flat development of the body-side compartment, gas is introduced into the passenger-side compartment from a gas communicating port formed at the outer periphery of the middle base cloth, which is evacuated outside from an exhaust port formed in the passenger-side compartment.

With the airbags including the middle base cloth having the center portion fixed by the restricting means, the middle base cloth can easily be set with regard to its dimension of protrusion, while it is complicated in structure due to need of reinforcement, which complicates the manufacturing process of the airbags and their assemblage to airbag arrangements.

It is, therefore, an object of the present invention to provide an airbag and an airbag arrangement that ensure excellent development characteristics with reduced manufacturing cost.

SUMMARY OF THE INVENTION

One aspect of the present invention lies in providing an airbag, comprising:

base cloths arranged in layers and between a support and an object to be restrained;

compartments defined by said base cloths;

communicating portions arranged in the vicinity of an outer periphery of the airbag, said communicating portions ensuring communication between said compartments;

an exhaust portion arranged in one compartment on the side of said object, said exhaust portion being disposed at an inner periphery of the airbag with respect to said communicating portions, said exhaust portion communicating with the outside;

an introduction portion arranged in another compartment, said introduction portion being disposed at said inner periphery with respect to said exhaust portion, said introduction portion serving to introduce gas into the airbag; and fixing portions arranged around said introduction portion, said fixing portions connecting said base cloths for defining said another compartment.

Another aspect of the present invention lies in providing an airbag arrangement, comprising:

a support fixed to a vehicle-side member;

an airbag mounted to said support for restraining an object, said airbag including:

base cloths arranged in layers and between said support and said object, compartments defined by said base cloths, communicating portions arranged in the vicinity of an outer periphery of the airbag, said communicating portions ensuring communication between said compartments, an exhaust portion arranged in one compartment on the side of said object, said exhaust portion being disposed at an inner periphery of the airbag with respect to said communicating portions, said exhaust portion communicating with the outside, an introduction portion arranged in another compartment, said introduction portion being disposed at said inner periphery with respect to said exhaust portion, said introduction portion serving to introduce gas into the airbag, and fixing portions arranged around said introduction portion, said fixing portions connecting said base cloths for defining said another compartment; and a housing receiving said airbag, said housing including a door that opens rotatively upon inflation of said airbag.

Still another aspect of the present invention lies in providing, in a motor vehicle:

a member;

a support fixed to said member;

an airbag mounted to said support for restraining an object, said airbag including:

base cloths arranged in layers and between said support and said object, compartments defined by said base cloths, communicating portions arranged in the vicinity of an outer periphery of the airbag, said communicating portions ensuring communication between said compartments, an exhaust portion arranged in one compartment on the side of said object, said exhaust portion being disposed at an inner periphery of the airbag with respect to said communicating portions, said exhaust portion communicating with the outside, an introduction portion arranged in another compartment, said introduction portion being disposed at said inner periphery with respect to said exhaust portion, said introduction portion serving to introduce gas into the airbag, and fixing portions arranged around said introduction portion, said fixing portions connecting said base cloths for defining said another compartment; and a housing receiving said airbag, said housing including a door that opens rotatively upon inflation of said airbag.

DETAILED DESCRIPTION OF THE INVENTION

Referring to the drawings, an airbag and an airbag arrangement embodying the present invention will be described.

Referring to FIGS. 1–3D, an airbag 1 constitutes an airbag arrangement 2 that is mounted to a steering wheel 3 of a motor vehicle at a main body or a mounting member 4 so as to alleviate an impact to be applied to a vehicle occupant or an object to be restrained A (see FIG. 3D) in the event of a vehicle collision. Ordinarily, the steering-wheel main body 4 is mounted to an inclined steering shaft S for its use in the inclined state. Refer hereafter to the side having the airbag arrangement 2 as occupant side, face side or the like, and to the side opposite to the occupant side as body side, back side or the like.

Figure 1:
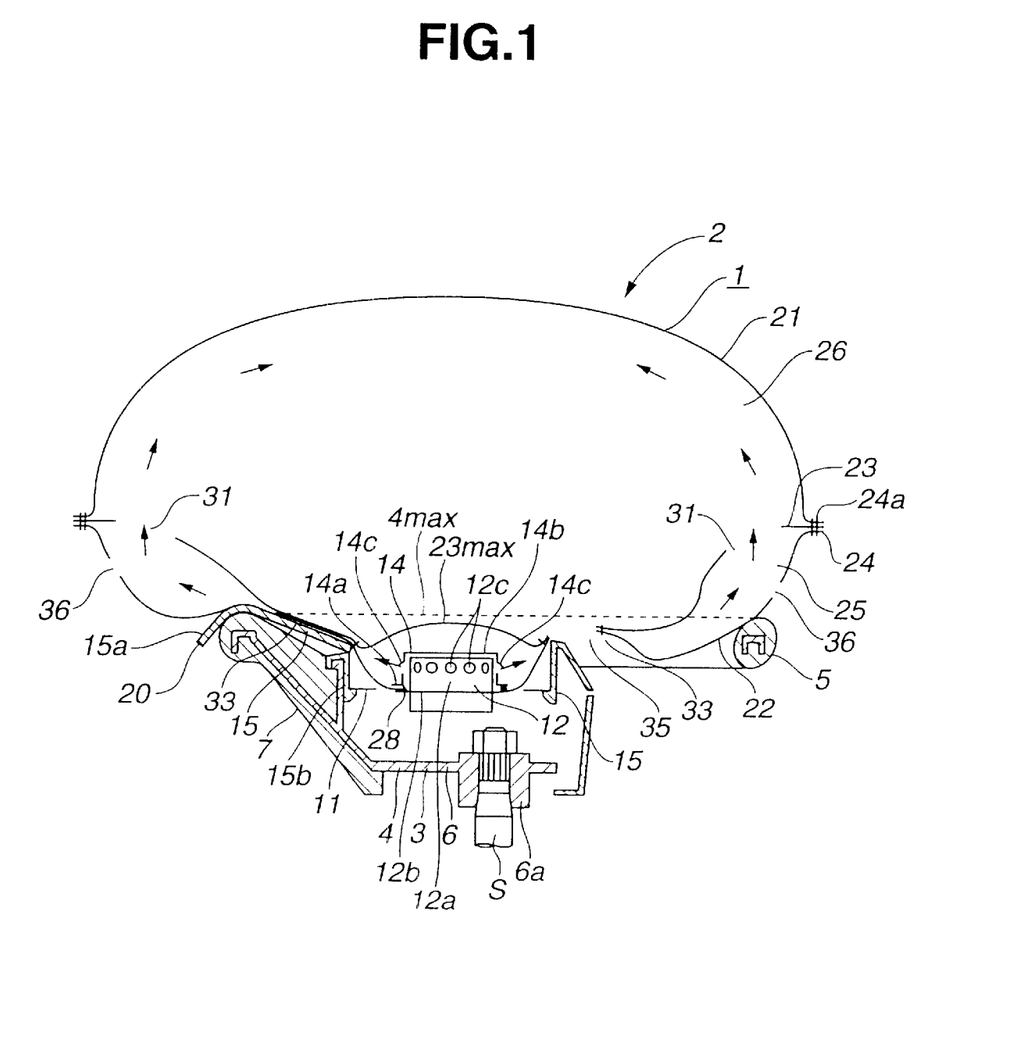
FIG. 1 is a sectional view taken along the line I—I in FIG. 2, showing an embodiment of an airbag arrangement according to the present invention.

The steering-wheel main body 4 comprises an annular rim or holder ring 5, a boss 6 disposed inside the rim 5, and a plurality of, e.g. three or four, spokes 7 for connecting the rim 5 and the boss 6. The boss 6 includes a boss portion 6a with which the steering shaft S is engaged.

The airbag arrangement 2 comprises a base plate or a support 11 and members mounted thereto, such as an airbag 1, an inflator 12, a retainer 14, and a housing 15.

The base plate 11 is obtained, for example, by pressing a metal plate, and has a substantially rectangular base portion and a peripheral portion obtained by integrally downwardly bending the outer periphery of the base portion. The base portion has a circular inflator mounting hole formed substantially in the center, and a plurality of, e.g. four, bolt mounting holes formed therearound. The peripheral portion includes mounting lugs mounted to a core bar of the boss 6 of the steering-wheel main body 4.

As shown in FIG. 1, the inflator 12 includes a substantially cylindrical main body 12a and a flange 12b protruding from the outer periphery thereof. The inflator 12 has gas injection ports 12c formed above the flange 12b. The flange 12b is formed with bolt mounting holes that communicate with those of the base plate 11.

The retainer 14 includes a main body 14a formed, for example, like a ring, and a cup-like swelling or diffuser 14b integrated therewith to swell upward and for covering an upper side portion of the inflator main body 12a. The swelling 14b has gas ports 14c formed, for example, circumferentially. Mounting bolts are fixed downward to the retainer main body 14a to engage with corresponding mounting holes.

The housing 15 is formed in one piece out of synthetic resin, and includes a cover 15a with curved surface for partly covering the boss 6 and the rim 7 of the steering-wheel main body 4 and a rectangular-tube-like mounting wall 15b arranged to protrude downward from the lower side of the cover 15a. The lower side of the cover 15a and the inside of the mounting wall 15b cooperate with each other to define a storage space of the airbag 1. The mounting wall 15b, engaged with the outer periphery of the peripheral portion of the base plate 11, is fixed thereto by rivets or the like. The lower side of the cover 15a is formed with a fragile tear line shaped, e.g. substantially like a letter H as viewed in plan to face the storage space of the airbag 1. Upon development of the airbag 1, the cover 15a is broken along the tear line, which forms a door 20 that opens rotatively.

The airbag 1 includes a first base cloth or a face panel 21 and a second base cloth or a back panel 22, which are of a circular shape and disposed above and below. Moreover, the airbag 1 includes a middle base cloth or a center panel 23 that is of a circular shape and disposed between the first and second base cloths 21, 22. The base cloths 21, 22, 23 are sewn together along an outer peripheral sewing portion 24a of an outer periphery 24. The first and second base cloths 21, 22 form a flat-bag-like outer shell, and the middle base cloth 23 defines in the outer shell a first compartment 25 and a second compartment 26 disposed above the first compartment 25, i.e. on the occupant side.

Figure 2:
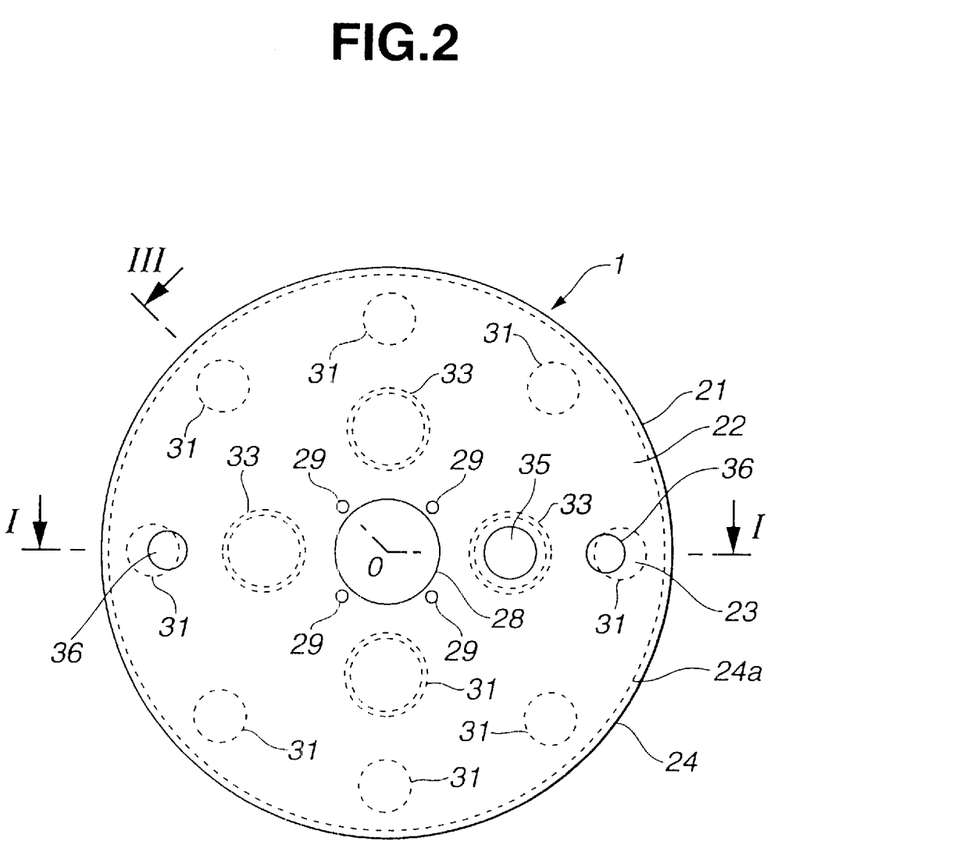
FIG. 2 is a bottom view showing the airbag arrangement.

As best seen in FIG. 2, the second base cloth 22 disposed below has a gas introduction port or portion or an inflator opening 28 disposed in the center, and bolt mounting holes or bag fixing holes 29 disposed around the gas introduction port 28.

The middle base cloth 23 is formed with gas communicating ports or portions 31 in the vicinity of the outer periphery 24. The gas communicating ports 31, having a circular or substantially oval shape, are disposed circumferentially substantially equidistantly.

The middle base cloth 23 and the second base cloth 22 are sewn together substantially airtighty by a thread through a plurality of, e.g. four, ring-like fixing portions 33 disposed nearer the center than the gas communicating ports 31 and between the gas introduction port 28 and the gas communicating ports 31.

At least one fixing portion 33 has an exhaust port or portion or a vent hole 35 formed inside. Specifically, the exhaust port 35 does not communicate with the first compartment 25, but ensures direct communication between the second compartment 26 and the body-side outside of the airbag 1.

The second base cloth 22 is formed with one or more, e.g. two, auxiliary exhaust ports or portions or vent holes 36 in the vicinity of the outer periphery 24. Each auxiliary exhaust port 36 is smaller in diameter than each gas communicating port 31 to have greater air-flow resistance. The auxiliary exhaust ports 36 ensure direct communication between the first compartment 25 and the body-side outside of the airbag 1.

When assembling the airbag arrangement 2, the retainer 14 is inserted into the first compartment 25 of the airbag 1, and the mounting bolts are engaged with the bolt mounting holes 29 of the airbag 1 and the base plate 11. The airbag 1 is folded in a predetermined shape, and the housing 15 is disposed on the base plate 11 from above to engage therewith. Through the inflator mounting hole of the base plate 11 and the gas introduction port 28 of the airbag 1, the upper side portion of the inflator 12 is inserted into the first compartment 25 of the airbag 1 from below. The mounting bolts are engaged with the bolt mounting holes of the flange 12b, which are tightened by nuts from below. Thus, the airbag 1 and the base plate 11 are securely arranged between the retainer 14 and the inflator 12, obtained the airbag arrangement 2 assembled.

The airbag arrangement 2 is mounted to the steering wheel 3 by fixing the mounting lugs of the base plate 11 to the core bar of the boss 6 of the steering-wheel main body 4 through bolts or the like.

If the motor vehicle with the airbag arrangement 2 undergoes a collision impact, a control unit, not shown, actuates the inflator 12 to promptly jet gas into the airbag 1 from the gas injection ports 12c of the inflator 12. Then, the airbag arrangement 2 forms a projection opening by breaking the housing 15 along the tear line and rotating the door 20. The airbag 1 is inflated through the projection opening to form a predetermined shape in front of the occupant A so as to hold and restrain the occupant A thrown forward, alleviating an impact to be applied to him or her.

Referring to FIGS. 1 and 3A–3D, inflating action of the airbag 1 will be described in detail.

Figure 3A:
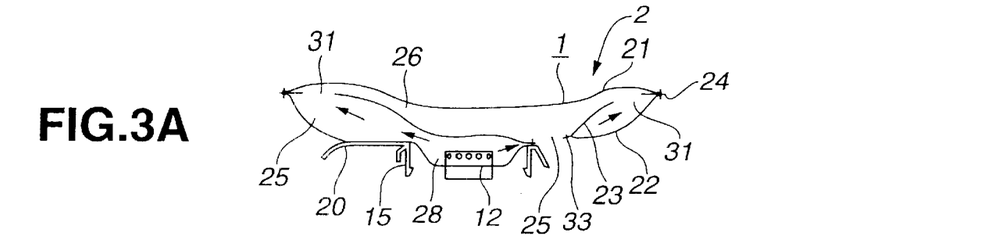
FIGS. 3A–3D are schematic sections taken along the line I-O-III in FIG. 2, showing inflating action of an airbag.
Figure 3B:
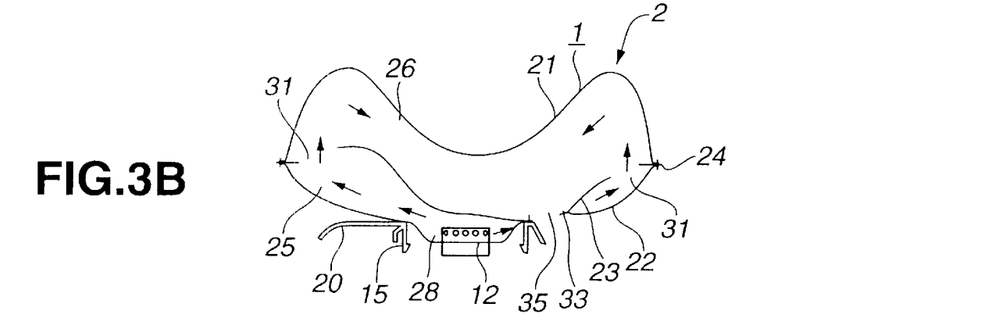
Figure 3C:
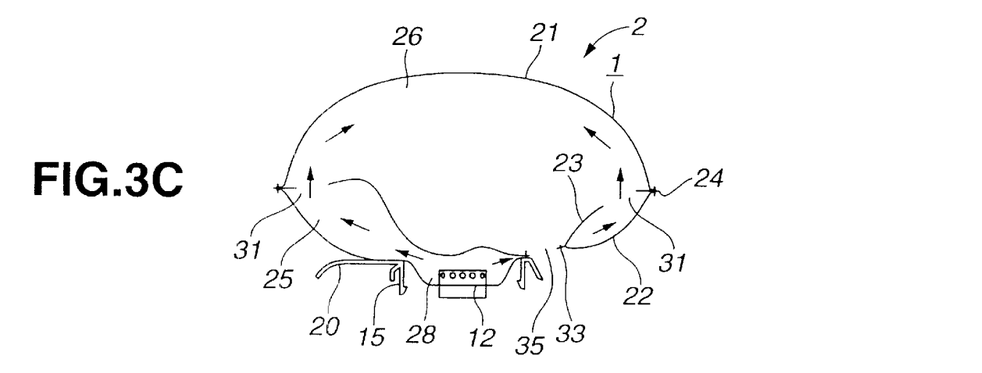

Referring to FIG. 3A, gas jetted from the inflator 12 is directly radially introduced into the first compartment 25 of the airbag 1. Since the middle base cloth 23 is connected to the second base cloth 22 by the fixing portions 33 disposed around the gas introduction port 28, and the second base cloth 22 is fixed to the base plate 11, the first compartment 25 is developed in the direction of the outer periphery with its extremely flat shape preserved. Then, referring to FIG. 3B, gas flows into the second compartment 26 disposed on the occupant side from the gas communicating ports 31 formed in the vicinity of the periphery 24 so as to inflate the second compartment 26 from the outer periphery, obtaining the airbag 1 inflated in a predetermined shape as shown in FIGS. 1 and 3C.

A maximum protruding position 23max of the second compartment 26, i.e. the middle base cloth 23, to the occupant side during the inflation process of the airbag 1 is determined so as not to exceed a maximum protruding position 4max of the steering-wheel main body 4 to the occupant side, i.e. an imaginary plane formed by an edge of the rim 5 on the occupant side.

Figure 3D:
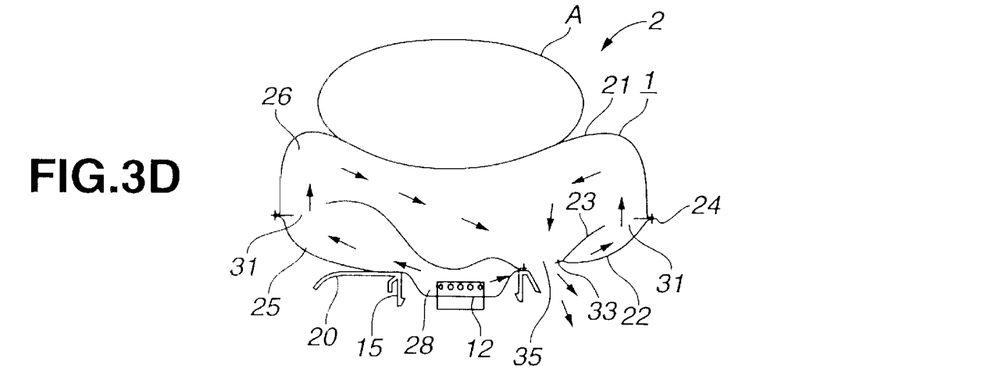

Referring to FIG. 3D, when the occupant A contacts the airbag 1, for example, gas is evacuated from the exhaust port 35 that communicates with the second compartment 26, absorbing an impact applied to the occupant A.

As described above, in this embodiment, the middle base cloth 23, disposed inside the airbag 1, is formed with the gas communicating ports 31 in the vicinity of the outer periphery to clearly define gas passages, and is connected to the second base cloth 22 by the fixing portions 33. Thus, at the initial stage of development, the first compartment 25 disposed on the body side is immediately inflated in the direction of the outer periphery, then, the second compartment 26 disposed on the occupant side is inflated from the outer periphery to the center. This enables, for example, lagged development of a center portion of the airbag 1 that is apt to apply a maximum load to an occupant's thorax, and thus a restriction of its dimension of protrusion with respect to the occupant A and the pressure to be applied to him or her. Moreover, the maximum protruding position 23max of the second compartment 26, i.e. the middle base cloth 23, to the occupant side during the inflation process of the airbag 1 is determined so as not to exceed the maximum protruding position 4max of the steering-wheel main body 4 to the occupant side, i.e. the imaginary plane formed by the edge of the rim 5 on the occupant side. This enables a safe restraint of the occupant A with alleviated pressure to be applied to his or her thorax even if the airbag 1 is actuated when he or she is seated in an extremely forward-bent posture with his or her thorax almost contacting the steering wheel 3, for example.

Further, in order to restrict the dimension of protrusion of the middle base cloth 23, the fixing portions 33 are arranged which have sewn portions disposed around the gas introduction port 28, i.e. the inflator 12, and for connecting the middle base cloth 23 and the second base cloth 22. This method of fixing the middle base cloth 23 through the fixing portions 33 is simpler than that of fixing the base cloth 23 to the retainer 14 or the base plate 11 through restricting means such as bolts, allowing simplification of assemblage of the airbag 1 to the steering-wheel main body 4 or thermal and mechanical reinforcement of the middle base cloth 23. This enables a reduction in manufacturing cost of the airbag 1 and thus assembling cost of the airbag arrangement 2, resulting in provision of the airbag arrangement 2 and steering-wheel 3 at low prices.

Still further, the structure of the fixing portion 33 having a ring shape and the exhaust port 35 formed inside allows integrated formation of the two, enabling not only improved strength and space efficiency of the airbag 1, but easy manufacture thereof, resulting in a reduction in both size and manufacturing cost of the airbag 1.

Furthermore, gas jetted from the inflator 12 inflates the first compartment 25, then the second compartment 26, which is evacuated from the exhaust port 35 to the body-side outside of the airbag 1, enabling the shape of development of the airbag 1 maintained during a long period of time, resulting in stable achievement of high impact absorbing characteristics of the airbag 1. Additionally, the synergistic effect of the long gas passages and the exhaust port 35 depressed inside with respect to the second base cloth 22 can restrain heat released outside from the airbag 1.

Further, the second base cloth 22 has the auxiliary exhaust ports 36 in the vicinity of the outer periphery 24 to ensure direct communication between the first compartment 25 and the body-side outside of the airbag 1. This enables a prevention of the pressure within the first compartment 25 from increasing to a higher value than required in the event that the gas communicating ports 31 are closed temporally, for example.

Figure 4:
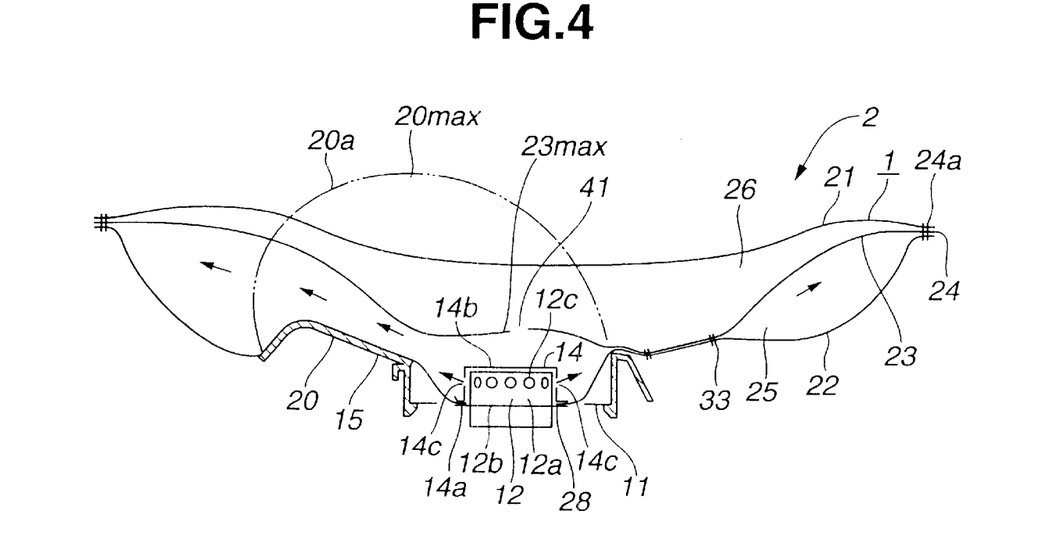
FIG. 4 is a view similar to FIG. 1, taken along the line I-O-III in FIG. 2, showing another embodiment of the present invention.

In addition to the gas communicating ports 31, an auxiliary gas communicating portion may be arranged to ensure gas communication between the first compartment 25 and the second compartment 26 that is a compartment adjacent thereto. In another embodiment, the second compartment 26 can slightly be inflated at the initial stage of inflation, allowing smooth introduction of gas from the gas communicating ports 31. Referring to FIG. 4, the auxiliary gas communicating portion may be in the form of an auxiliary gas communicating port 41 formed circularly in the center of the middle base cloth 23 and having a smaller diameter than that of the gas communicating port 31.

In the above embodiments, the maximum protruding position 23max of the second compartment 26, i.e. the middle base cloth 23, to the occupant side during the inflation process of the airbag 1 is determined so as not to exceed the maximum protruding position 4max of the steeringwheel main body 4 to the occupant side, i.e. the imaginary plane formed by the edge of the rim 5 on the occupant side. Alternatively, referring to FIG. 4, in place of or together with this condition, the maximum protruding position 23max may be determined so as not to exceed a maximum protruding position 20max of a rotation locus or path of the door 20 of the housing 15 to the occupant side. This enables a safe restraint of the occupant A with alleviated pressure to be applied to his or her thorax even if the airbag 1 is actuated when he or she is seated in an extremely forward-bent posture with his or her thorax almost contacting the steering wheel 3, for example.

Further, in the above embodiments, an edge of the periphery 24 of the base cloths 21, 22, 23 sewn together along the outer peripheral sewing portion 24a faces outward. Alternatively, referring to FIG. 5, the edge of the periphery 24 of the base cloths 21, 22, 23 may face inward. In this case, the base cloths 21, 22, 23 are sewn together at the outer periphery by changing the order, then, the second base cloth 22 is reversed through the gas introduction port 28 to make the fixing portions 33.

Figure 5:
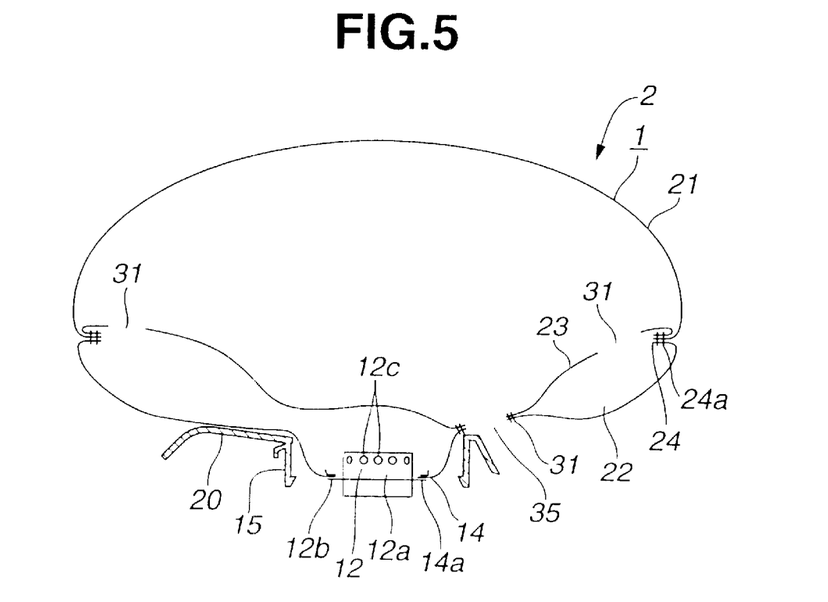
FIG. 5 is a view similar to FIG. 4, taken along the line I—I in FIG. 2, showing still another embodiment of the present invention.

Still further, in order to achieve simplified structure and reduced manufacturing cost, the retainer 14 may have no swelling 14b as shown in FIG. 5.

Furthermore, the fixing portions 33 for connecting the second and middle base cloths 22, 23, at least one of which having the exhaust port 35 formed inside, may not necessarily be of a ring shape. In case of positional restriction of the exhaust port 35, for example, the one fixing portion 33 may be of a modified ring shape or be arranged separately from the exhaust port 35 and at the inner periphery with respect thereto.

Figure 6:
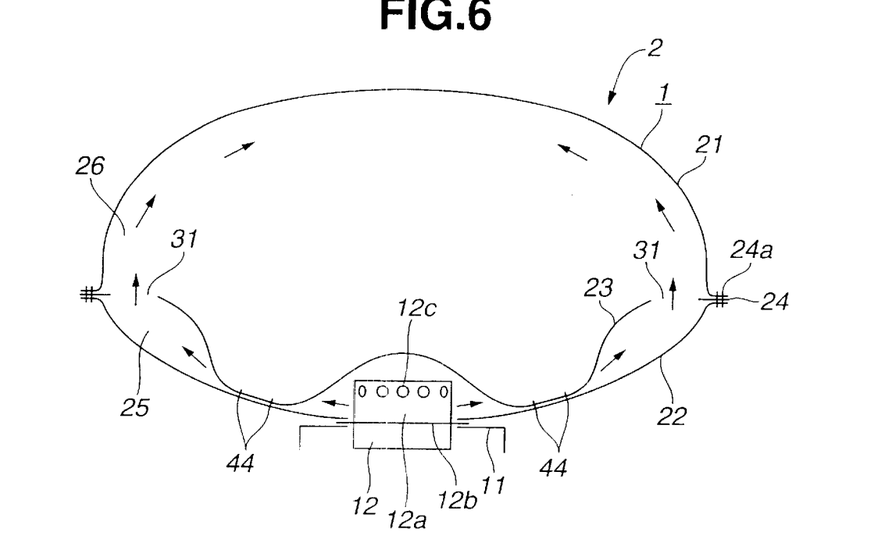
FIG. 6 is a view similar to FIG. 5, taken along the line VI—VI in FIG. 7, showing a further embodiment of the present invention.
Figure 7:
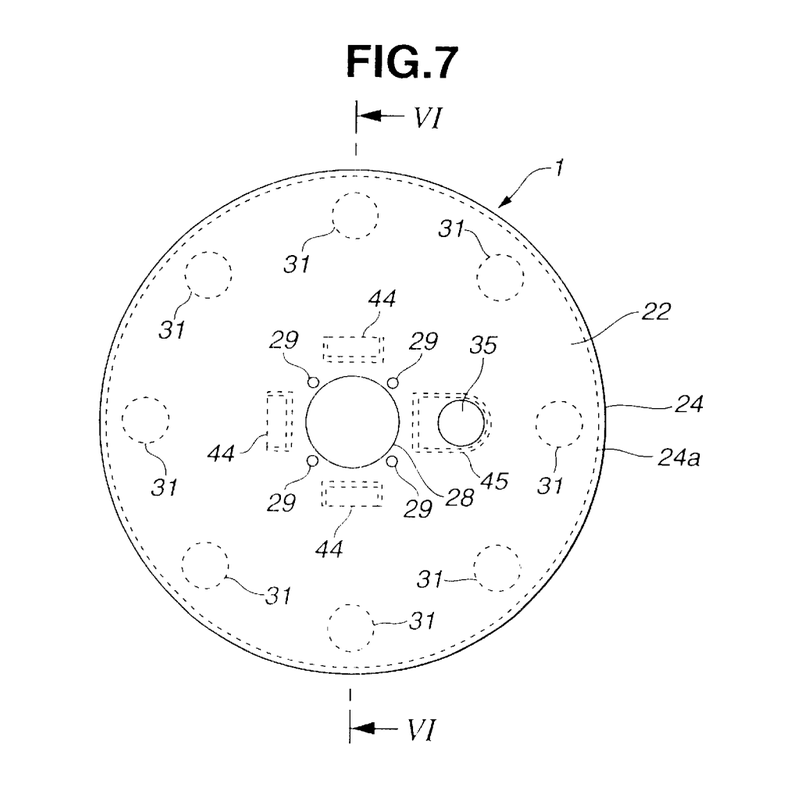
FIG. 7 is a view similar to FIG. 2, showing the airbag in FIG. 6.

Specifically, referring to FIGS. 6–7, a fixing portion 44 may be of a box shape in the position where no exhaust port 35 is arranged, and a fixing portion 45 may be of a modified ring shape in the position where the exhaust port 35 is arranged. The fixing portion 45 is arranged to adjacently curvedly surround the exhaust port 35 at the outer periphery of the airbag 1, and extend to the vicinity of the gas introduction port 28 at the inner periphery of the airbag 1.

Further, in the above embodiments, the airbag 1 includes one middle base cloth 23 for defining two compartments 25, 26, which contributes surely to simplified structure and reduced manufacturing cost of the airbag 1. Alternatively, the airbag 1 may include two or more middle base cloths for defining three or more compartments arranged in layers so as to obtain finer control of gas flow.

Still further, the openings for ensuring gas communication are not necessarily in the form of ports, and may be in the form of portions of the base cloths with increased gas permeability.

Furthermore, in the above embodiments, the airbag arrangement 2 is mounted to the steering-wheel main body 4 to restrain a driver. Alternatively, it may be mounted to an instrument panel or the side or the rear of a seat to restrain a passenger. Moreover, the airbag arrangement 2 can widely be used for absorbing a collision impact on an object to be restrained.

The entire contents of Japanese Patent Application P11-123117 are incorporated herein by reference.

What is claimed is:

1. An airbag adapted to restrain an object, comprising:
   base cloths arranged in layers and between a support and the object;
   compartments defined by said base cloths;
   communicating portions arranged proximate an outer-periphery of the airbag, said communicating portions ensuring communicating between said compartments;
   an exhaust portion arranged in one compartment on the side of said object, said exhaust portion being disposed at an inner periphery of the airbag and at a position interior of said communicating portions, said exhaust portion communicating with the outside;
   an introduction portion arranged in another compartment, said introduction portion being disposed at said inner periphery with respect to said exhaust portion, said introduction portion serving to introduce gas into the airbag; and
   fixing portions arranged around said introduction portion, said fixing portions connecting said base cloths for defining said another compartment.

2. The airbag as claimed in claim 1, wherein said exhaust portion communicates only said one compartment with the outside at a position proximate said support.

3. The airbag as claimed in claim 1, wherein said fixing portions are obtained by sewing said base cloths together.

4. The airbag as claimed in claim 3, wherein said fixing portions are of a predetermined shape.

5. The airbag as claimed in claim 4, wherein said predetermined shape of said fixing portions is a ring.

6. The airbag as claimed in claim 4, wherein one of said fixing portions surrounds said exhaust portion.

7. The airbag as claimed in claim 1, further comprising an auxiliary communicating portion disposed opposite to said introduction portion, said auxiliary communicating portion ensuring communication between said one compartment and said another compartment.

8. The airbag as claimed in claim 7, further comprising an auxiliary exhaust portion ensuring communication between said another compartment and the outside.

9. The airbag as claimed in claim 1, wherein said base cloths have edges facing outward.

10. The airbag as claimed in claim 1, wherein said edges of said base cloths face inward.

11. An airbag arrangement, comprising:
    a support fixed to a vehicle-side member;
    an airbag mounted to said support for restraining an object, said airbag comprising:
      base cloths arranged in layers and between said support and said object,
      compartments defined by said base cloths,
      communicating portions arranged proximate an outer periphery of the airbag, said communicating portions ensuring communication between said compartments,
      an exhaust portion arranged in one compartment on the side of said object, said exhaust portion being disposed at an inner periphery of the airbag and at a position interior of said communicating portions, said exhaust portion communicating with the outside,
      an introduction portion arranged in another compartment, said introduction portion being disposed at said inner periphery with respect to said exhaust portion, said introduction portion serving to introduce gas into the airbag, and
      fixing portions arranged around said introduction portion, said fixing portions connecting said base cloths for defining said another compartment; and
    a housing receiving said airbag, said housing including a door that opens rotatively upon inflation of said airbag .

12. The airbag arrangement as claimed in claim 11, wherein a maximum protruding position of said base cloth for defining said another compartment in a direction of said object is determined to fail to exceed a maximum protruding position of a rotation locus of said door of said housing in said direction of said object.

13. The air bag arrangement as claimed in claim 11, wherein a maximum protruding position of said base cloth for defining said another compartment in a direction of said object is determined to fail to exceed a maximum protruding position of said vehicle-side member in said direction of said object.

14. A motor vehicle, comprising:

a member:

a support fixed to said member;

an airbag mounted to said support for restraining an object, said airbag comprising:

base cloths arranged in layers and between said support and said object, compartments defined by said base cloths, communicating portions arranged proximate an outer periphery of the airbag, said communicating portions ensuring communication between said compartments, an exhaust portion arranged in one compartment on the side of said object, said exhaust portion being disposed at an inner periphery of the airbag and at a position interior of said communicating portions, said exhaust portion communicating with the outside, an introduction portion arranged in another compartment, said introduction portion being disposed at said inner periphery with respect to said exhaust portion, said introduction portion serving to introduce gas into the airbag;

fixing portions arranged around said introduction portion, said fixing portions connecting said base cloths for defining said another compartment; and a housing receiving said airbag, said housing including a door that opens rotatively upon inflation of said airbag.

15. The motor vehicle as claimed in claim 14, wherein a maximum protruding position of said base cloth for defining said another compartment in a direction of said object is determined to fail to exceed a maximum protruding position of a rotation locus of said door of said housing in said direction of said object.

16. The motor vehicle as claimed in claim 14, wherein a maximum protruding position of said base cloth for defining said another compartment in a direction of said object is determined to fail to exceed a maximum protruding position of said vehicle-side member in said direction of said object.

\* \* \* \* \*